United States Patent
Ren et al.

(10) Patent No.: US 11,638,960 B2
(45) Date of Patent: May 2, 2023

(54) FLAT DRILL BIT

(71) Applicant: Bosch Power Tools (CHINA) Co., LTD, Hangzhou (CN)

(72) Inventors: Jun Ren, Hangzhou (CN); Chenying Li, Hangzhou (CN); Jie Lin, Hangzhou (CN)

(73) Assignee: BOSCH POWER TOOLS (CHINA) CO., LTD, Hangzhou (CN)

(*) Notice: Subject to any disclaimer, the term of this patent is extended or adjusted under 35 U.S.C. 154(b) by 46 days.

(21) Appl. No.: 17/233,247

(22) Filed: Apr. 16, 2021

(65) Prior Publication Data

US 2021/0268590 A1 Sep. 2, 2021

Related U.S. Application Data

(63) Continuation-in-part of application No. PCT/CN2019/108124, filed on Sep. 26, 2019.

(30) Foreign Application Priority Data

Oct. 26, 2018 (CN) .......................... 201821747576.4

(51) Int. Cl.
*B23B 51/00* (2006.01)
*B27G 15/00* (2006.01)

(52) U.S. Cl.
CPC .......... *B23B 51/0095* (2022.01); *B27G 15/00* (2013.01); *Y10T 408/899* (2015.01)

(58) Field of Classification Search
CPC .......... B23B 51/00035; B23B 51/0095; B27G 15/00; Y10T 408/899; Y10T 408/902
See application file for complete search history.

(56) References Cited

U.S. PATENT DOCUMENTS

| 88,760 | A | * | 4/1869 | Whitehouse | ........... | B27G 15/00 |
| | | | | | | 408/214 |
| 778,845 | A | * | 1/1905 | Cox | ....................... | B27G 15/00 |
| | | | | | | 408/214 |
| 2,883,888 | A | | 4/1959 | Stewart | | |
| 3,920,350 | A | * | 11/1975 | Southall | ................. | B27G 15/00 |
| | | | | | | 408/214 |

(Continued)

FOREIGN PATENT DOCUMENTS

| CA | 966704 A | 4/1975 |
| CN | 200984763 Y | 12/2007 |

(Continued)

*Primary Examiner* — Eric A. Gates
(74) *Attorney, Agent, or Firm* — Norton Rose Fulbright US LLP

(57) ABSTRACT

A flat drill bit includes a stem body, a cut flute part provided axially from an end of the stem body and being generally flat-shaped, and a threaded guiding part provided axially from an end of the cut flute part. The cut flute part includes two longitudinal wings which are configured to be rotationally symmetrical to each other about a longitudinal central axis (O) of the flat drill bit. Each longitudinal wing is formed with a cutting edge at the end of the cut flute part from which the threaded guiding part extends. A rotating trajectory profile caused by the cutting edge when the flat drill bit rotates is inclined towards the stem body and is at an angle (a) relative to the longitudinal central axis (O), and the angle (a) is in a range between 84° and 86°.

19 Claims, 3 Drawing Sheets

(56) References Cited

U.S. PATENT DOCUMENTS

| | | | |
|---|---|---|---|
| 5,193,951 A | | 3/1993 | Schimke |
| 5,291,806 A | | 3/1994 | Bothum |
| 5,382,251 A | | 1/1995 | Hood et al. |
| 5,697,738 A | * | 12/1997 | Stone ........................ B21K 5/02 |
| | | | 408/228 |
| 6,354,773 B1 | | 3/2002 | Konen |
| 6,652,202 B2 | | 11/2003 | Remke et al. |
| D620,334 S | * | 7/2010 | Evatt ............................ D15/139 |
| 8,366,357 B2 | * | 2/2013 | Dost ....................... B27G 15/00 |
| | | | 408/223 |
| 8,979,444 B2 | * | 3/2015 | Dost ........................ B23P 15/28 |
| | | | 408/214 |
| D917,589 S | * | 4/2021 | Kirby ........................... D15/139 |
| 2001/0010784 A1 | | 8/2001 | Giebmanns |
| 2008/0101879 A1 | * | 5/2008 | Durfee .............. B23B 51/00035 |
| | | | 408/214 |
| 2017/0225280 A1 | | 8/2017 | Wang |

FOREIGN PATENT DOCUMENTS

| | | |
|---|---|---|
| CN | 201217206 Y | 4/2009 |
| CN | 103341656 A | 10/2013 |
| CN | 207695690 U | 8/2018 |
| CN | 108481481 A * | 9/2018 |
| CN | 210025589 U | 2/2020 |
| DE | 2654400 A1 | 6/1978 |
| DE | 8906443 U1 | 7/1989 |
| EP | 3162480 A1 | 5/2017 |
| FR | 549471 A * | 2/1923 |
| FR | 2457752 A1 | 12/1980 |
| JP | 11156811 A * | 6/1999 |
| NL | 7611151 A | 4/1977 |

\* cited by examiner

FLAT DRILL BIT

CROSS-REFERENCE TO RELATED APPLICATIONS

The present application is a continuation-in-part of, and claims priority under 35 U.S.C. § 120 to, International Pat. App. No. PCT/CN2019/108124 filed Sep. 26, 2019, and claims priority under 35 U.S.C. § 119 to CN 201821747576.4, filed in China on Oct. 26, 2018, the content of each of which are incorporated herein by reference in their entireties.

FIELD OF THE INVENTION

The present invention generally relates to a flat drill bit, especially a wood drill bit for a cordless hand-held electric power tool.

BACKGROUND INFORMATION

In the field of wood processing, a flat drill bit is a well-known device. Typically, the flat drill bit is installed onto a clamp head of an electric power tool so as to quickly drill a hole in a wood material. The flat drill bit is widely used in construction of a house, for example, a wooden house. For instance, during the construction of the wooden house, prior to drilling the hole in the wood material, an invisible nail might be left in the wood material. Often, a cutting edge of the flat drill bit strikes the nail, so as to cause a fracture of the cutting edge and thus affect the use of the bit. Furthermore, the flat drill bit is usually provided with a threaded guiding part by which the flat drill bit can be introduced to move in the wood material before the cutting edge of the flat drill bit contacts the wood material. As a cordless hand-held electric power tool is energized by a battery, the power output by an electric motor of the power tool and the torque produced by the same are limited. In this case, coordinating the torque of the electric motor and the introduction speed of the flat drill bit is important.

SUMMARY OF THE INVENTION

The present invention relates to a flat drill bit for a cordless hand-held electric power tool by which nail cutting is optimized.

According to one aspect of the present invention, the flat drill bit includes:
  a stem body;
  a cut flute part provided axially from an end of the stem body and being generally flat-shaped; and
  a threaded guiding part provided axially from an end of the cut flute part, where the cut flute part includes two longitudinal wings which are configured to be rotationally symmetrical to each other about a longitudinal central axis of the flat drill bit, and each longitudinal wing is formed with a cutting edge at the end of the cut flute part from which the threaded guiding part extends, a rotating trajectory profile caused by the cutting edge when the flat drill bit rotates is inclined towards the stem body and is at an angle relative to the longitudinal central axis, and the angle is in a range between 84° and 86°.

In an example embodiment of the present invention, the threaded guiding part is in the form of a cone with external threads, which cone has a base connected to the cut flute part, and the maximum diameter of the threaded guiding part is not greater than an external diameter of a cutting face formed by the cutting edges when rotating about the longitudinal central axis.

In an example embodiment of the present invention, the cone has a cone angle which is between 23° and 29°, where the external threads have a pitch which is between 1.2 millimeters and 1.3 millimeters.

In an example embodiment of the present invention, the cone angle is 26°, and/or the pitch of the external threads is 1.25 millimeters.

In an example embodiment of the present invention, observed in a cross-section perpendicular to the longitudinal central axis between the end of the cut flute part, from which the threaded guiding part extends, and the stem body, at least a portion of each longitudinal wing is configured in such a way that it has a width which becomes gradually greater from the longitudinal central axis radially outwards.

In an example embodiment of the present invention, a radially inward concave cutting part is formed at the base of the cone and upstream of one cutting edge along a cutting rotation direction of the flat drill bit, so as to ensure that the drilling caused by the external threads of the guiding part is closely followed by the drilling caused by the cutting edge.

In an example embodiment of the present invention, the two longitudinal wings define two radially opposing longitudinal grooves in the cut flute part.

In an example embodiment of the present invention, observed in an axial end view of the flat drill bit, the two cutting edges are co-linear to each other and run across the longitudinal central axis.

In an example embodiment of the present invention, the cut flute part is integrally formed with the stem body, and/or that the threaded guiding part is integrally formed with the cut flute part.

In an example embodiment of the present invention, each longitudinal wing is provided in the form of a flat shape which gradually tapers from the stem body towards the threaded guiding part, and defines a flute groove in the cut flute part.

In an example embodiment of the present invention, a clamp head of the cordless hand-held electric power tool is installed with a flat drill bit as described above.

As a result, the possibility of the cutting edge fracture of the flat drill bit due to nail cutting in a wood material can be greatly reduced. Design of the threaded guiding part is optimized with respect to torque characteristics of an electric motor of the cordless hand-held electric power tool, such that the use efficiency of the flat drill bit can be improved.

The foregoing and other aspects of the present invention can be fully understood by the following description in combination with the drawings. It should be noted that although the drawings may be given in different scales, they will not affect understanding to the present invention. It should also be noted that in the drawings of the present invention, those features having the same configuration or a similar function can be represented by the same reference numerals. In the drawings:

DETAILED DESCRIPTION

Figure 1:
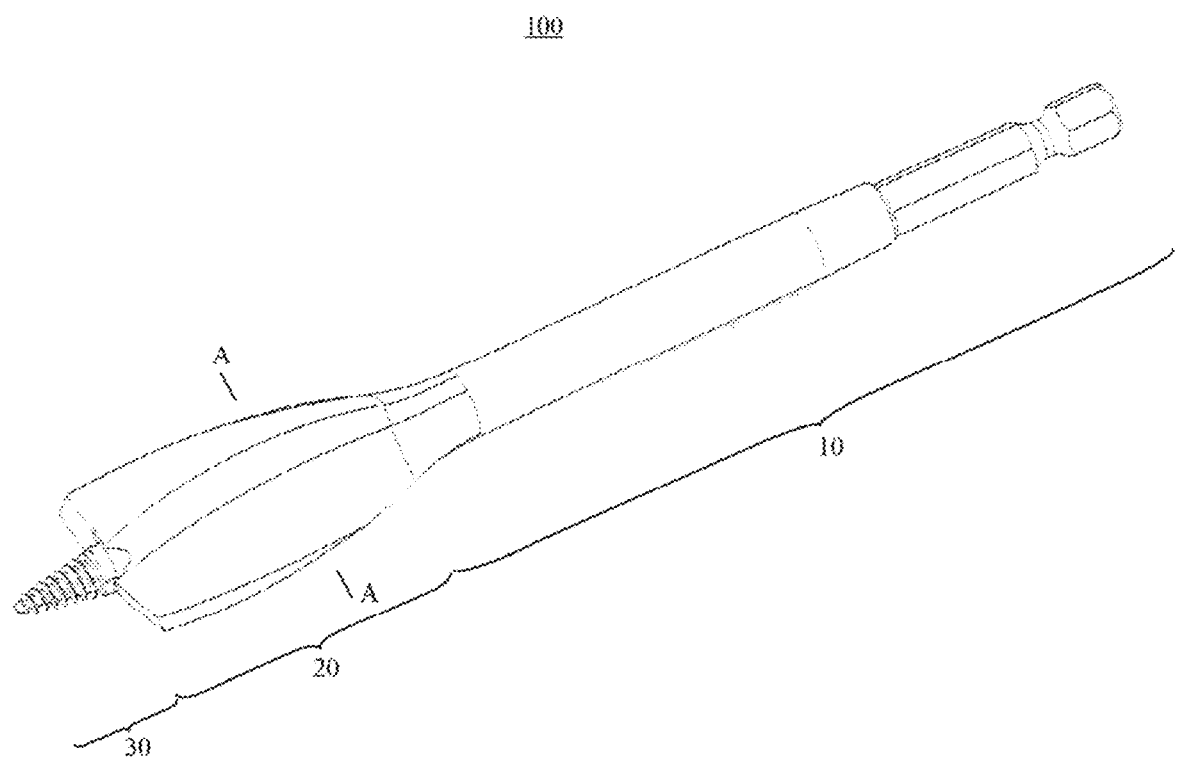
FIG. 1 shows a perspective view schematically illustrating a flat drill bit according to an example embodiment of the present invention.

FIG. 1 shows a perspective view schematically illustrating a flat drill bit 100 according to an example embodiment of the present invention. The flat drill bit 100 generally includes a stem body 10, a cut flute part 20 which is provided axially from one end of the stem body 10, preferably integrally formed therewith, and a threaded guiding part 30 which is provided axially from an end of the cut flute part 20 opposing the stem body 10, preferably integrally provided therewith. The flat drill bit 100 is formed as a single piece by a high-strength metal such as an alloy. The stem body 10 is provided with a clamping part which is installable on a clamp head of an electric power tool, especially of a cordless hand-held electric power tool (not shown in FIG. 1). For instance, an end of the stem body 10 opposing the cut flute part 20 is shaped as being hexagonal such that it can be driven by an electric motor of the electric power tool to rotate about its longitudinal central axis after the flat drill bit 100 is secured in place on the clamp head. In this way, a hole can be drilled in a wood material.

Figure 2:
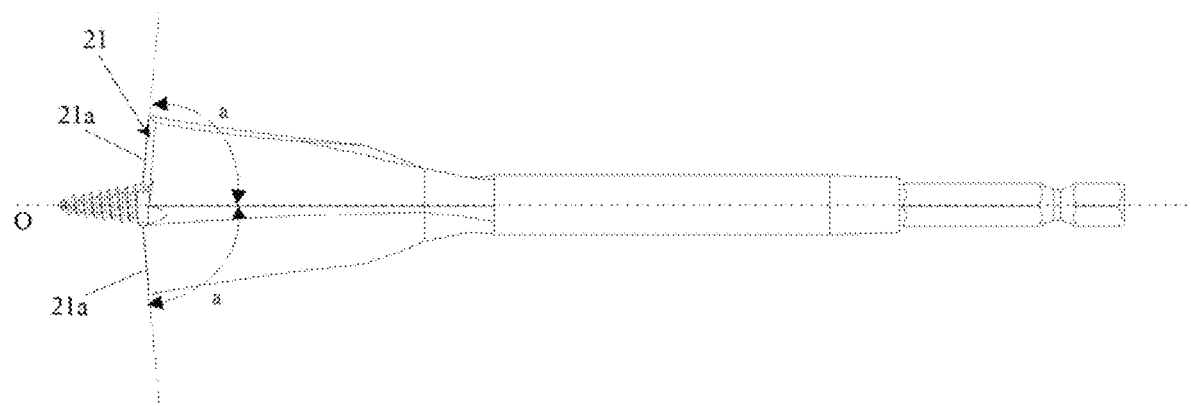
FIG. 2 shows an axial lateral view schematically illustrating the flat drill bit of FIG. 1, according to an example embodiment of the present invention.
Figure 3:
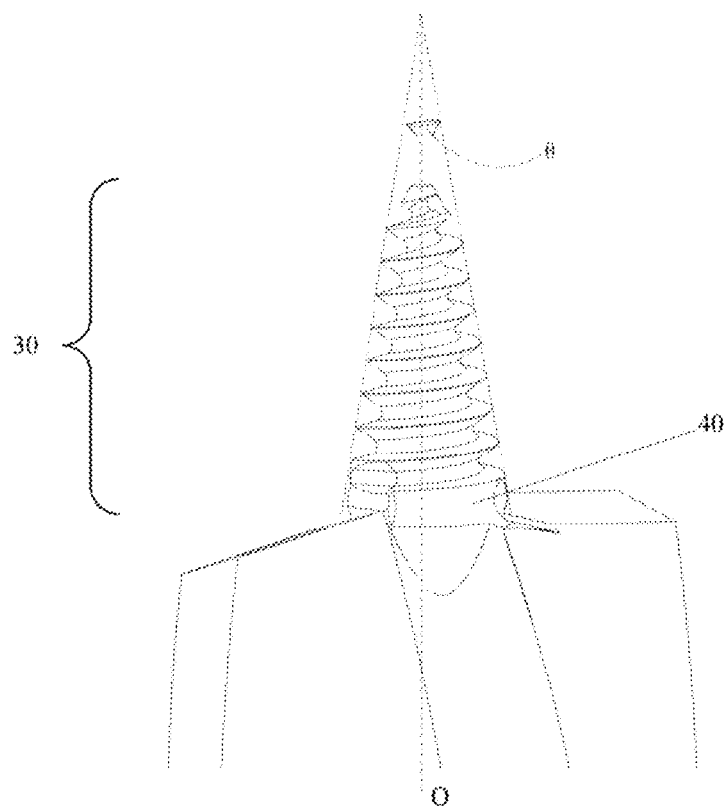
FIG. 3 shows an axial lateral view schematically illustrating a part of the flat drill bit, in particular, a threaded guiding part of the flat drill bit according to the example embodiment of the present invention.

FIG. 2 shows an axial lateral view schematically illustrating the flat drill bit 100 according to an example embodiment of the present invention. Along a direction in which the flat drill bit 100 is advanced in the wood material, the threaded guiding part 30 is located upstream of the cut flute part 20. Specifically, as shown by FIG. 3, the threaded guiding part 30 is substantially shaped as a cone with external threads. The cone has a base connected to the cut flute part 20. After the flat drill bit 100 is installed onto the electric power tool to drill the hole in the wood material, the threaded guiding part 30 can first contact the wood material's surface so as to determine a location where the hole is to be drilled. Thereafter, as the threaded guiding part 30 is driven by the electric motor of the electric power tool to rotate, the threaded guiding part 30 can be screwed into the wood material under a longitudinal pressing force. With introduction by the threads of the guiding part 30, the rotating cut flute part 20 is driven to move into the wood material.

As shown in FIG. 3, in an axial lateral view of the flat drill bit 100 or in a longitudinal section passing through the longitudinal central axis O of the flat drill bit 100, an angle θ included between lines passing through outermost boundaries (points) of the threads of the guiding part 30 is between 23° and 29°, preferably is 26°. Furthermore, observed in the axial lateral view, the cone of the guiding part 30 extends from its free terminal up to the cut flute part 20. Furthermore, in order to ensure that the electric motor of the cordless hand-held electric power tool can provide a sufficient torque for the guiding part 30 and ensure that the flat drill bit 100 can advance at an adequate speed during the initial period of drilling the hole, the threads of the guiding part 30 can have a pitch of 1.25 mm.

Figure 4:
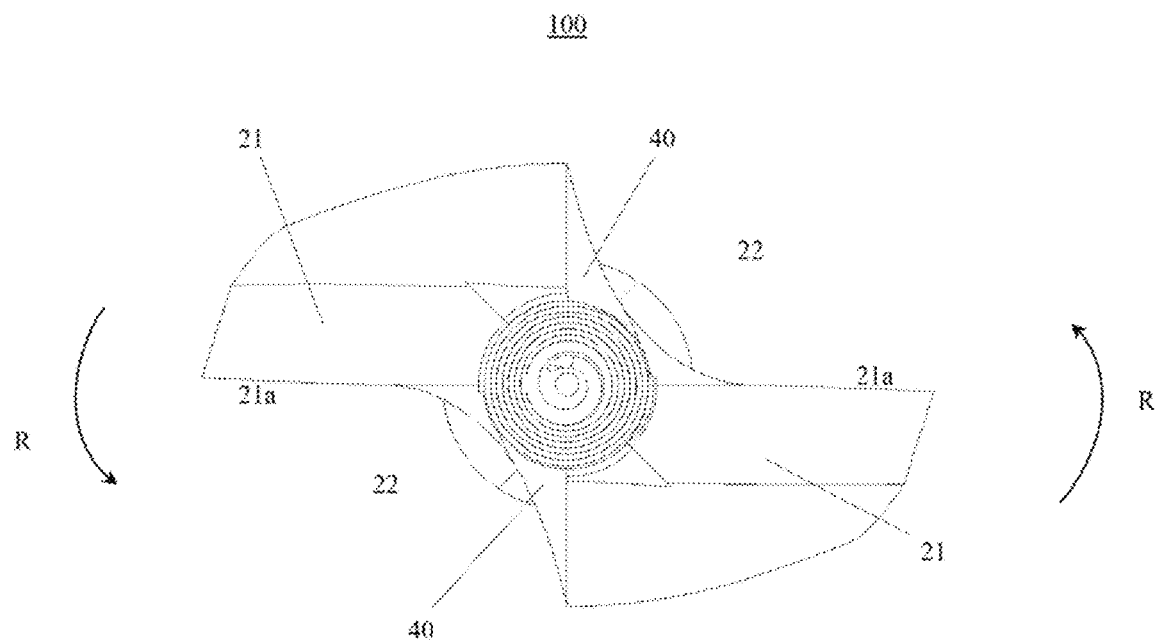
FIG. 4 shows an axial end view of the flat drill bit schematically observed from an end of the flat drill bit where the threaded guiding part is located according to the example embodiment of the present invention.

The cut flute part 20 is generally flat, having two cutting edges 21a. In the present invention, although the cut flute part 20 is flat, its cross-section can vary along the longitudinal central axis. As shown in FIGS. 2 and 4, each cutting edge 21a is defined by a cutting side 21 located at a free end of the cut flute part 20 (from which end the guiding part 30 extends), such that observed from the guiding part 30 (as shown in FIG. 4), as the flat drill bit 100 rotates along a direction of circumference (i.e. a cutting rotation direction) R, the cutting edge 21a is able to strike the wood material to be machined, always first in the cutting rotation direction R to any remaining part of the respective cut flute part 20. Observed in the axial lateral view of the flat drill bit 100, as shown in FIG. 2, the cutting edge 21a is inclined at an angle a relative to the longitudinal central axis O of the flat drill bit 100 in a downstream direction, i.e., towards the stem body 10. The angle a is in a range between 84° and 86°. In an example embodiment, the cutting edge 21a is not perpendicular to the longitudinal central axis O, especially at an angle of less than 90° to the longitudinal central axis O, as shown in the axial view of FIG. 2 or 3. In the present invention, the longitudinal central axes of the stem body 10, the cut flute part 20 and the guiding part 30 of the flat drill bit 100 are coaxial with each other, and they can be regarded as the longitudinal central axis O. It will be appreciated that the maximum diameter of the cone-shaped guiding part 30 shall not be greater than an external diameter of a cutting profile formed by the cutting edges 21a when being rotated about the longitudinal central axis O.

In a preferred example embodiment of the present invention, as shown in FIG. 2, the two cutting edges 21a are mirror-symmetric about the longitudinal central axis O. As the flat drill bit 100 rotates, the profile formed by the rotation of the cutting edges 21a is inclined at the angle a in the downstream direction, i.e., towards the stem body 10. In this way, when the cut flute part 20 is advanced in the wood material to drill the hole and if any nail exists in the wood material, it is always a portion of the cutting edge 21a adjacent to the longitudinal central axis O (i.e., a portion of the cutting edge 21a whose radius to the longitudinal central axis O is minimal) that first strikes the nail. Therefore, a smaller resistance force will generate when the portion strikes the nail, resulting in less damage to the cutting edges 21a and facilitating the integrity of the cutting edges 21a.

Figure 5:
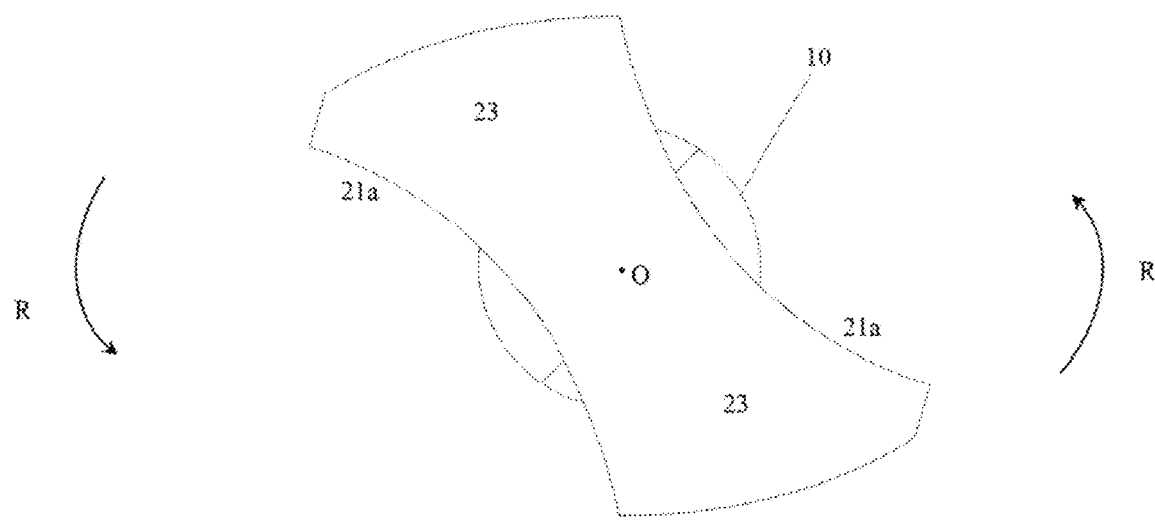
FIG. 5 shows a cross-sectional view obtained along a section A-A of FIG. 1, which schematically illustrates the flat drill bit, according to an example embodiment of the present invention.

The two cutting edges 21a are straight line-shaped. Observed in the axial end view (shown in FIG. 4), the cutting edges 21a are co-linear and run across the longitudinal central axis O of the flat drill bit 100. Starting from the cutting side 21, the cut flute part 20 extends in the downstream direction up to the stem body 10. The cut flute part 20 is provided with two longitudinal grooves 22 which are radially opposite to each other relative to the longitudinal central axis O. As shown, the grooves 22 are radially concave, and are configured to at least partially extend along the longitudinal central axis O in a spiral manner. FIG. 5 shows a cross-sectional view of the cut flute part 20 of the flat drill bit 100, which view is perpendicular to the longitudinal central axis O. It can be seen that the cut flute part 20 is formed by two longitudinal wings 23, where the two longitudinal wings 23 are provided to be rotationally symmetrical to each other about the longitudinal central axis O. In the context of the present invention, the term "longitudinal" referring to each longitudinal wing means that the wing is distributed along the longitudinal central axis of the flat drill bit 100 and can be configured in any suitable manner. The cutting side 21, by which the cutting edge 21a is defined, is formed on the end of the cut flute part 20 from which the threaded guiding part 30 extends, at each respective longitudinal wing 23. Each longitudinal wing is configured as a flat shape gradually tapering from the stem body towards the threaded guiding part. The longitudinal grooves 22, i.e., flute grooves, are provided on two radially opposing sides of the two longitudinal wings 23, respectively.

The longitudinal grooves 22 are used to discharge out debris generated when the cutting edges 21a are used to drill the hole in the wood material. Furthermore, as seen in the cross-section, each longitudinal wing 23 gradually tapers radially from the outside to the inside. At least a portion of each longitudinal wing 23 is formed in such a way that its width becomes gradually greater from the longitudinal central axis O radially outwards. In this way, the strength of the cutting edge 21a adjacent to the radial boundary can be improved. Therefore, even if a portion of the cutting edge 21a far away from the longitudinal central axis O comes into contact with a nail, the cutting edge 21a will not be prone to breakage because of the improved strength of the corresponding longitudinal wing 23. The shape of the cut flute part 20 or its longitudinal wing 23 is not limited to that as illustrated and other shapes are within the scope of the present invention. Any shape enabling the longitudinal wing 23 to be gradually thickened radially from the inside to the outside is within the scope of the present invention.

In order to ensure that the drilling action caused by the flat drill bit 100 when operating can be successfully transited from the threads of its guiding part 30 to the cutting edges 21a of the cut flute part 20, i.e., in order that the cutting edges 21a are able to freely continue to cut in the wood material after cutting of the threads of the guiding part in the wood material has completed with the flat drill bit 100 rotating, a radially inward concave cutting part 40 is formed between the base of the guiding part 30 and the cutting edges 21a of the cut flute part 20 in such a way that when the flat drill bit 100 is rotated for drilling, the drilling caused by the threads of the guiding part 30 is closely followed by the drilling caused by the cutting edge 21a of the cut flute part 20. In this way, the flat drill bit 100 is able to be introduced by the guiding part 30 during the early stage to move in the wood material and then the cutting edges 21a are able to be used to smoothly drill.

In the context of the present invention, the embodiments can be arbitrarily combined with each other. Although some specific embodiments of the present invention have been disclosed and described herein, they are provided for illustrative purposes only and cannot be deemed to constrain the scope of the present invention. Without departing from the spirit and scope of the present invention, various alternations, replacements and modifications of the above-disclosed embodiments fall within the scope of the invention and will be readily apparent to those of ordinary skill in the art.

What is claimed is:

1. A flat drill bit comprising:
   a stem body;
   a substantially flat-shaped cut flute part extending axially from an end of the stem body; and
   a threaded guiding part extending axially from an end of the cut flute part,
   wherein the cut flute part includes two longitudinal wings which are rotationally symmetrical to each other about a longitudinal central axis of the flat drill bit,
   wherein each longitudinal wing of the two longitudinal wings is formed with a cutting edge at the end of the cut flute part, and
   wherein, when the flat drill bit rotates, a rotating trajectory profile caused by the cutting edge of each longitudinal wing is inclined towards the stem body and is at an angle relative to the longitudinal central axis in a range between 84° and 86°.

2. The flat drill bit as recited in claim 1, wherein the threaded guiding part is cone shaped, has external threads, and has a base connected to the cut flute part, wherein a maximum diameter of the threaded guiding part is not greater than an external diameter of a cutting face formed by the cutting edge of each longitudinal wing when rotating about the longitudinal central axis.

3. The flat drill bit as recited in claim 2, wherein the cone has a cone angle in a range between 23° and 29°, wherein the external threads have a pitch in a range between 1.2 millimeters and 1.3 millimeters.

4. The flat drill bit as recited in claim 3, wherein the cone angle is 26°, and/or the pitch of the external threads is 1.25 millimeters.

5. The flat drill bit as recited in claim 4, wherein a radially inward concave cutting part is formed at the base and upstream of the cutting edge in a cutting rotation direction of the flat drill bit, wherein a drilling caused by the external threads is followed by a drilling caused by the cutting edge.

6. The flat drill bit as recited in claim 3, wherein a radially inward concave cutting part is formed at the base and upstream of the cutting edge in a cutting rotation direction of the flat drill bit, wherein a drilling caused by the external threads is followed by a drilling caused by the cutting edge.

7. The flat drill bit as recited in claim 3, wherein each longitudinal wing has a flat shape which gradually tapers from the stem body towards the threaded guiding part and defines a flute groove in the cut flute part.

8. The flat drill bit as recited in claim 2, wherein a radially inward concave cutting part is formed at the base and upstream of the cutting edge in a cutting rotation direction of the flat drill bit, wherein a drilling caused by the external threads is followed by a drilling caused by the cutting edge.

9. The flat drill bit as recited in claim 2, wherein each longitudinal wing has a flat shape which gradually tapers from the stem body towards the threaded guiding part and defines a flute groove in the cut flute part.

10. The flat drill bit as recited in claim 1, wherein, observed in a cross-section perpendicular to the longitudinal central axis and between the end of the cut flute part and the stem body, at least a portion of each longitudinal wing tapers radially outward from the longitudinal central axis.

11. The flat drill bit as recited in claim 10, wherein the two longitudinal wings define two radially opposing longitudinal grooves in the cut flute part.

12. The flat drill bit as recited in claim 1, wherein, in an axial end view of the flat drill bit, the two cutting edges are co-linear to each other and run across the longitudinal central axis.

13. The flat drill bit as recited in claim 1, wherein the cut flute part is integrally formed with the stem body and/or the threaded guiding part is integrally formed with the cut flute part.

14. The flat drill bit as recited in claim 1, wherein each longitudinal wing has a flat shape which gradually tapers from the stem body towards the threaded guiding part and defines a flute groove in the cut flute part.

15. A cordless hand-held electric power tool, wherein a clamp head of the cordless hand-held electric power tool is installed with a flat drill bit as recited in claim 1.

16. A flat drill bit, comprising:
a stem body;
a cut flute part extending axially from an end of the stem body; and
a threaded guiding part extending axially from an end of the cut flute part opposing the stem body,
wherein the stem body, the cut flute part, and the threaded guiding part are integrally formed with each other,
wherein the cut flute part is defined with two longitudinal grooves which are radially opposite to each other relative to a longitudinal central axis of the flat drill bit,
wherein the cut flute part is formed with two cutting edges at the end of the cut flute part, and observed in an axial view of the flat drill bit, the two cutting edges are inclined at an angle of less than 90° relative to the longitudinal central axis towards the stem body,
wherein, in an axial end view of the flat drill bit, the two cutting edges are co-linear to each other and run across the longitudinal central axis.

17. The flat drill bit as recited in claim 16, wherein the two longitudinal grooves are radially concave and at least partially extend along the longitudinal central axis in a spiral manner.

18. The flat drill bit as recited in claim 17, wherein the cut flute part is formed by two longitudinal wings which are rotationally symmetrical to each other about the longitudinal central axis of the flat drill bit, and each longitudinal wing is formed with the two cutting edges at the end of the cut flute part.

19. The flat drill bit as recited in claim 18, wherein at least a portion of each longitudinal wing is configured in such a way that observed in a cross-section perpendicular to the longitudinal central axis, each wing tapers radially outward from the longitudinal central axis.

* * * * *